C. R. WEST.
ATTACHMENT FOR AUTOMOBILES.
APPLICATION FILED MAR. 23, 1910.
983,103.
Patented Jan. 31, 1911.
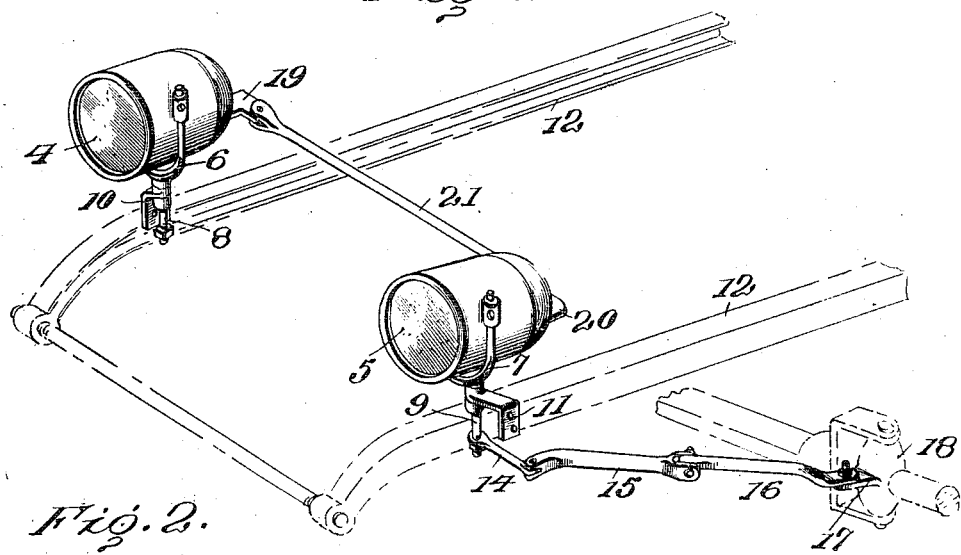
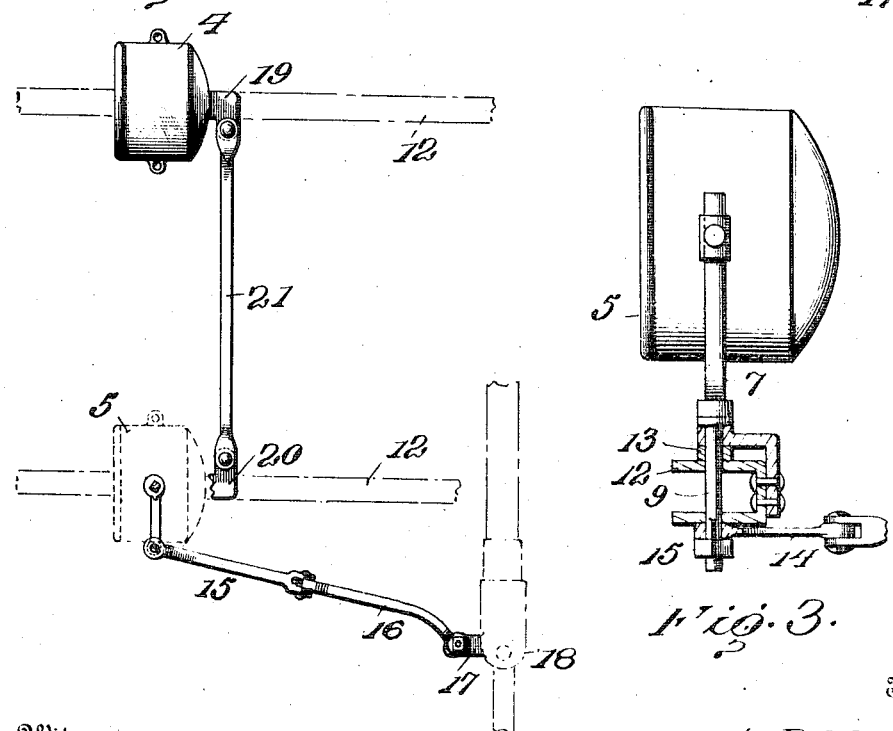
Witnesses
Chas. Y. Nellis
W. H. Boone
Inventor
C. R. West

UNITED STATES PATENT OFFICE.

CARL R. WEST, OF WASHINGTON, INDIANA.

ATTACHMENT FOR AUTOMOBILES.

983,103.  Specification of Letters Patent.  Patented Jan. 31, 1911.

Application filed March 23, 1910. Serial No. 551,126.

*To all whom it may concern:*

Be it known that I, CARL R. WEST, a citizen of the United States, residing at Washington, in the county of Daviess and State of Indiana, have invented certain new and useful Improvements in Attachments for Automobiles, of which the following is, a specification.

This invention relates to an attachment for automobiles through the instrumentality of which the lamps or search-lights carried by the automobile may be automatically shifted to follow the track as the steering-gear is manipulated to make the automobile itself follow the track.

The invention therefore consists in the structure and application of the attachment for this purpose substantially as hereinafter set forth and claimed.

In the accompanying sheet of drawings which form a part of this specification Figure 1 represents in perspective two lamps mounted upon the frame of an automobile and so connected with the swinging axle of one of the forward wheels as to be oscillated horizontally in the steering of the automobile; Fig. 2 is a plan view of the structure seen in Fig. 1; and Fig. 3 is an enlarged detail partly in elevation and partly in vertical section representing the manner of mounting one of the lamps and of connecting the directing mechanism thereto.

In an attachment of this sort simplicity in structure and in operation are chiefly desirable and with this in mind the present invention has been developed. The harps for supporting the lamps 4 and 5 are indicated at 6 and 7, respectively, and are provided with shanks 8 and 9 extending through brackets 10 and 11, which are preferably riveted or bolted to the side bars 12 of the automobile frame. In the upper ends of the brackets 10 and 11 the shanks of the harps 6 and 7 are journaled as clearly shown in Fig. 3, a collar or nut as 13 being placed between the bracket and the side bars 12. Said shanks also preferably pass through holes in the side bars 12 and on the lower end of shank 8 a nut is turned to hold its respective lamp in its support. The lower end of shank 9 is squared to receive the crank arm 14, which is held in place against the under side of the side bar 12 by means of nut 15. To the outer end of crank arm 14 a rod 15 is connected by means of a knuckle. To the rod 15, another rod as 16 is connected by a knuckle joint whose pintle is horizontal. The other end of rod 16 is pivoted to a lug 17 projecting forwardly from the swivel of the forward axles 18. The rods 15 and 16 constitute a hinged link, the hinge being for the purpose of allowing for the vertical movement of the side bar 12 during the travel of the automobile. To the rear side of the lamps lugs as 19 and 20 are attached between which extends a connecting link 21 pivoted at its ends to said lugs.

It is readily seen that, upon the movement of axle 18 in steering the automobile, crank arm 14 will follow such movements and will therefore swing lamp 5 responsively and as lamp 4 is linked to lamp 5 it will also swing in response to the steering action. Both lamps will thus be caused to follow the track over which the automobile is steered.

It is obvious that the crank arm and its hinged link may be connected to either swiveled axle and that the link joining the lamps together may be otherwise located than illustrated without departing from the present invention.

The invention claimed is:—

In an attachment for moving automobile lamps synchronously with the forward wheels of the automobile, the combination with lamps mounted in suitable yokes provided with shanks adapted to pass through holes in the side-bars of the automobile frame, of brackets in which said shanks are journaled, said brackets being adapted to be secured to the said side-bars, collars about said shanks between the brackets and side-bars, a crank-arm secured to one of said shanks below the respective side-bar, nuts for the lower ends of said shanks, a lug upon the swivel of the forward axle at the side next to the said crank arm, a link for the purpose specified pivoted to said lug and to said crank arm and having a hinge therein whose pintle is substantially horizontal, and a link pivoted at its ends to the rear sides of said lamps whereby both lamps are adapted to be moved in unison.

In testimony whereof I affix my signature in presence of two witnesses.

CARL R. WEST.

Witnesses:
PARIS A. HASTINGS,
JOHN T. HARRIS.